March 17, 1964  H. M. STOLLER  3,125,027
SELF-REGULATING POWER SUPPLY
Filed Aug. 4, 1950

Inventor
Hugh M. Stoller, deceased
By Marian M. Stoller, executrix
By G.J. Kessenich, J.H. Church + M.L. Libman
Attorneys

3,125,027
SELF-REGULATING POWER SUPPLY
Hugh M. Stoller, deceased, late of Mountain Lakes, N.J., by Marian M. Stoller, executrix, Mountain Lakes, N.J., assignor, by mesne assignments, to the United States of America as represented by the Secretary of the Army
Filed Aug. 4, 1950, Ser. No. 177,657
1 Claim. (Cl. 102—70.2)

This invention relates to improvements in the art of regulating variable speed generators and more particularly variable speed wind-driven generators for use with air-driving vehicles such as high speed airplanes or electronic fused projectile, such as proximity fuses.

One known type of generator for the above purpose consists of a set of fixed coils and a rotating permanent magnet. Such a device generates an alternating voltage whose frequency is proportional to the rotational speed and whose amplitude also tends to vary directly as the speed. A known practice for improving speed-voltage regulation is to shunt a frequency-sensitive loss load across the generator, loading the supply more heavily as the speed increases in order to provide an output voltage approximately independent of generator speed after the operating threshold is reached. Where the generator is used to supply D.C. plate current, its output must be rectified and filtered. I make use of the rectifier components (which are required in any event) in a voltage doubling arrangement including condensers, and use the same condensers as part of a tuned regulating system to maintain substantially constant output beyond the operating threshold of speed. Thus with a maximum of additional components I secure the advantage both of speed, regulation and of voltage doubling, with consequent reduction in size and weight of the generator equipment. This is of importance in all air driving vehicles and of particular importance in the case of proximity fuses where the space and weight limitations are exceptionally severe.

The specific nature of the invention as well as other objects and advantages thereof, will clearly appear from a description of a preferred embodiment as shown in the accompanying drawing in which.

Figure 1:
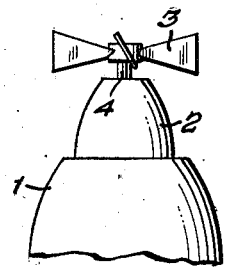
FIG. 1 is a schematic view of the forward end of a projectile employing a wind-driven generator.
Figure 2:
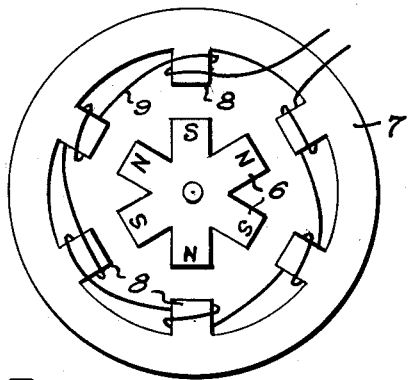
FIG. 2 is a schematic diagram showing the relation of poles and winding in a typical generator of the type to which my invention is applicable.
Figure 3:
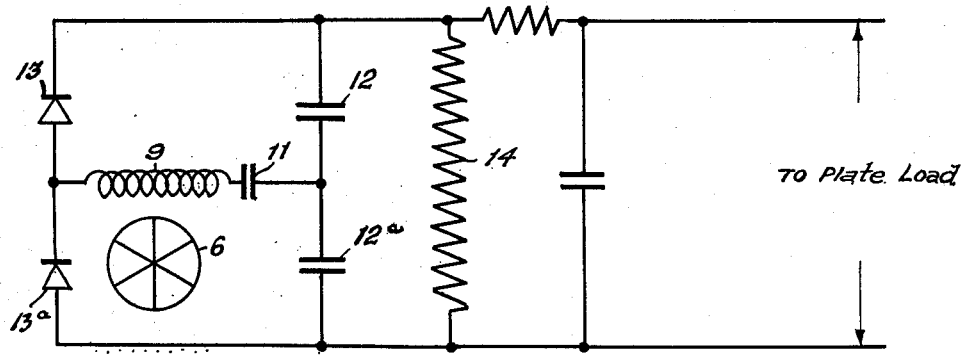
FIG. 3 shows a circuit arrangement illustrating the principles of my invention.
Figure 4:
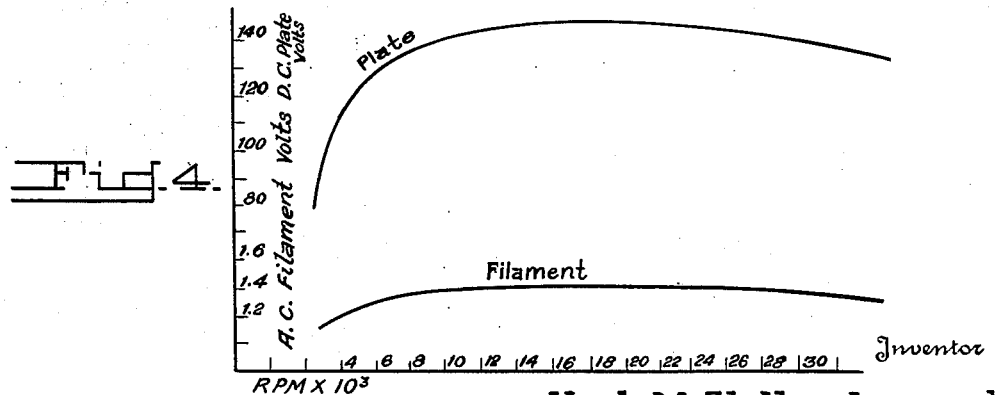
FIG. 4 is a graph typical filament and plate voltage-speed waves obtainable with my invention.

A typical use for my invention is in connection with power supply means for proximity fuses. As indicated in FIG. 1 such a fuse 2 may be mounted in conventional fashion on the forward end of a projectile 1, such as a bomb, rocket, or any other suitable projectile. A typical power supply for such a fuse is a wind-driven generator driven by a vane 3 on the forward end of the fuse. This vane rotates a shaft 4 which is usually fastened directly to the rotor which may be of the type shown in FIG. 2. This rotor is provided with alternate north and south magnetic poles shown as six in number, although any suitable number may be employed. The stator 7 is provided with a corresponding number of poles 8. Each pole has a winding 9 which is separately wound on adjacent poles so that the voltages induced in all the coils will be added when the coils are connected in series, as shown. A generator of this type produces an alternating voltage whose frequency is obviously proportional to the rotational speed of the rotor, and whose amplitude tends to increase with the speed. This speed is obviously a variable, depending on the rate of travel of projectile 1 through the air. In the case of a bomb the speed continues to increase for some time after the bomb is released, and in the case of a rocket the speed begins to decrease after the rocket propellant is exhausted. In either case, however, it is desirable and necessary that the voltage produced by the generator be maintained substantially constant over a wide range of speed, between a maximum and a minimum speed which represent the extremes encountered in normal operation during flight of the projectile. The highest voltage required is usually for the B supply of vacuum tubes energized by the generator. To provide a sufficiently high voltage with a minimum width and size of generator, and at the same time to provide a degree of regulation required, I utilize the arrangement shown in FIG. 3. In series with the winding 9 of the generator, I provide a condenser 11. The output of these elements is connected to the diagonals of a known type of voltage doubling bridge consisting of condensers 12, 12a and rectifiers 13, 13a connected as shown. I have found selenium rectifiers suitable for this purpose. The opposite diagonals of this bridge are utilized as the output terminals of the circuit. A resistance 14, for example in the order of 15,000 ohms is connected across these output terminals. Resistance 14 serves as an output resistance and prevents high potentials from developing across the condensers. Any suitable filter circuit may be employed to smooth out the direct current output of the power supply. In practice, a separate winding for an "A" supply is often also wound on the same poles of the stator. The value of condenser 11 is so chosen, in relation to the capacities of condensers 12 and 12a and to the inductance of winding 9, as to form a tuned circuit resonant at a frequency corresponding to some low speed of rotation of the generator, beyond which speed the voltage is desired to be as nearly constant as feasible. A typical voltage curve produced by this arrangement is shown in FIG. 4 where it will be seen that above 12,000 r.p.m. the output of both plate supply and the filament or "A" supply remain very nearly constant as the speed increases up to beyond 30,000 r.p.m. The improved filament supply regulation is due to its close coupling with the plate winding, so that it is necessary to positively regulate only the much larger plate winding to achieve the desired result.

It will be apparent that the embodiments shown are only exemplary and that various modifications can be made in construction and arrangement within the scope of my invention as defined in the appended claim.

I claim:

In an ordnance projectile, a self-regulating power supply system comprising: a wind-responsive vane adapted to rotate in response to flight of the projectile through the air; a generator having stationary high-voltage and low-voltage armature windings and a rotatable magnetic field member so constructed and arranged that rotation of said field member causes voltages to be generated in said windings; rotatable shaft means connecting said vane to said field member for rotating said field member in response to rotation of said vane; first and second output circuit points; a first diode having its anode connected to a first end of said high-voltage winding and its cathode connected to said first circuit point; a second diode having its cathode connected to said first end of said high-voltage winding and its anode connected to said second circuit point; first and second equal capacitances connected in series between said first and second circuit points; an output resistor connected between said first and second circuit points; and a third capacitance connected between the second end of said high-voltage winding and the junction of said first and second capacitances, said third capacitance having such a value, in relation to said first and second capacitances and to the inductance of said winding, as to cause said winding to be tuned to resonance at a frequency corresponding to a low speed of rotation of said vane.

References Cited in the file of this patent

UNITED STATES PATENTS

| | | |
|---|---|---|
| 2,206,446 | Bereskin | July 2, 1940 |

FOREIGN PATENTS

| | | |
|---|---|---|
| 497,697 | Germany | May 10, 1930 |
| 920,006 | France | Dec. 16, 1946 |